United States Patent [19]
Carter

[11] Patent Number: 6,119,230
[45] Date of Patent: Sep. 12, 2000

[54] DISTRIBUTED DYNAMIC SECURITY CAPABILITIES

[75] Inventor: Stephen R. Carter, Spanish Fork, Utah

[73] Assignee: Novell, Inc., Provo, Utah

[21] Appl. No.: 08/943,537

[22] Filed: Oct. 1, 1997

[51] Int. Cl.$^7$ ................................................ G06F 12/14
[52] U.S. Cl. ............................................................ 713/200
[58] Field of Search ................................... 713/200, 201, 713/202, 161; 709/229; 380/3, 229, 4, 232, 25, 30

[56] References Cited

U.S. PATENT DOCUMENTS

| | | | |
|---|---|---|---|
| 4,558,176 | 12/1985 | Arnold et al. | 380/4 |
| 4,599,509 | 7/1986 | Silverman et al. | 235/382 |
| 5,196,840 | 3/1993 | Leith et al. | 340/825.3 |
| 5,204,961 | 4/1993 | Barlow | 395/725 |
| 5,263,165 | 11/1993 | Janis | 395/725 |
| 5,315,657 | 5/1994 | Abadi et al. | 380/25 |
| 5,349,642 | 9/1994 | Kingdon | 380/25 |
| 5,481,715 | 1/1996 | Hamilton et al. | 395/700 |
| 5,604,490 | 2/1997 | Blakley, III et al. | 340/825.31 |
| 5,649,194 | 7/1997 | Miller et al. | 395/616 |
| 5,818,936 | 10/1998 | Mashayekhi | 380/25 |
| 5,913,025 | 6/1999 | Higley et al. | 713/201 |

FOREIGN PATENT DOCUMENTS 0 695 985 A1  2/1996  European Pat. Off. .

OTHER PUBLICATIONS

Lampson et al., Abstract—"Authentication in distributed systems:theory and practice" , *ACM Transaction on Computer Systems*,vol. 10, No. 4 (Nov. 1992), pp. 265–310.

Jurec et al., Abstract—"Exchange of patient records–prototype implementation of a security attributes service in X.500", *Proceedings of the 2ACM Conference on Computer and Communications Security*,pp. 30–38.

Chaum, Abstract—"Security without identification:transaction systems to make big brother obsolete", *Communications of the ACM*,vol. 28, No. (Oct. 1985) pp. 1030–1044.

Särs, "The SSH Transport Layer Protocol", *Dr. Dobb's Journal*,(Oct. 1997), pp. 38–43.

Tanenbaum, Distributed Operating Systems, Prentice Hall, Inc. (1995), pp. 544–63.

"Dover AFB employs Vigilant Networks with NDS™", *Electronic Government;Special Novell®Issue*,pp. 12–13.

Dalton et al., Windows NT Server 4: Security, Troubleshooting, and Optimization, New Riders Publishing (1996), pp. 92–93, 371–75.

Tanenbaum, Computer Networks, Third Edition, Prentice Hall, Inc. (1996), pp. 577–630.

Grimes, Professional DCOM Programming, Wrox Press (1997), Ch. 7 pp. 319–389.

Lampson et al., "Authentication in Distributed Systems: Theory and Practice", *ACM Transaction on Computer Systems*,vol. 10, No. 4 (Nov. 1992), pp. 265–310.

"DCE web and Security Domains", no later than May 16, 1997.

Steve Lewontin, "The DCE–Web: Securing the Enterprises Web", Nov. 1995.

"Secure Web–Architecture", no later than May 16, 1997.

"Secure Web Architecture–Scalability", no later than May 16, 1997.

"DCE Web Security", no later than May 16, 1997.

Rich Salz, "Re: [Q]DCE RPC Encription", Jul. 21, 1995.

*Primary Examiner*—Robert W. Beausoliel, Jr.
*Assistant Examiner*—Pierre Eddy Elisca
*Attorney, Agent, or Firm*—Computer Law++

[57] ABSTRACT

Methods and systems are provided for managing security credentials in a distributed computer system. Multiple security contexts may be defined for a given principal in the system without requiring the use of multiple accounts. A secure package is provided to allow the principal to roam. Methods are provided for identifying differences in the principal's access rights in different contexts and for updating the secure package as needed.

45 Claims, 3 Drawing Sheets

DISTRIBUTED DYNAMIC SECURITY CAPABILITIES

FIELD OF THE INVENTION

The present invention relates to security in computer systems, and more particularly to a system and method for issuing a secure package of credentials to a user or agent, providing different access capabilities at different system locations based in part on the secure package, and modifying the secure package to reflect local information about the access capabilities of the user or agent.

TECHNICAL BACKGROUND OF THE INVENTION

Various approaches have been proposed and/or implemented to support roaming users and roaming machines in distributed computer systems. One approach, which is implemented in Novell NetWare 4.1 and later versions and in Novell NDS software, allows users to gain access to multiple servers in a distributed directory tree without logging in and authenticating themselves to each server individually (NOVELL, NETWARE, and NDS are marks of Novell, Inc.). However, a separate account, and separate login and authentication processes, are still required before a user can login to a computer which is not part of the distributed directory tree, even if that computer is in network communication with a computer which is part of the tree.

An other approach, which involves home domains and logon certificates, is described in European Patent Application EP 0 695 985 A1, having priority based on U.S. application Ser. No. 277,144 filed Jul. 18, 1994 ("Logon Certificates Applications"), incorporated herein by reference. Logon certificates support disconnected operation in a distributed system. Each logon certificate is a secure package holding credentials information sufficient to establish the identity and access rights of a principal (a user or a machine) in a domain other than the principal's home domain. Access is enforced through means such as encryption and digital signatures. Logon certificates can be carried by the principal in convenient forms such as on a portable machine or on a floppy disk.

The relationship between a home domain and a distributed directory tree is not clear from the Logon Certificates Applications. The use of logon certificates is presented in the Logon Certificates Applications as an alternative to replicating credentials. Although credentials may be replicated in a distributed directory tree, however, replication is not required. More generally, domains and distributed directory trees differ in the services they provide, the hardware and software they require or allow, and in characteristics such as scalability and fault-tolerance.

However, a home domain and a distributed directory tree each define a context throughout which a given principal has identical access rights. Regardless of the location in the distributed directory tree at which the principal accesses the system, the principal has the same access rights. Similarly, a principal has the same access rights regardless of which location in the home domain is used to access the system. Indeed, if logon certificates are used, the principal will receive the same access rights regardless of whether the access attempt occurs inside the principal's home domain or outside that domain.

Uniformity of access rights simplifies the implementation of authentication methods, but in some situations more flexibility would be beneficial. For instance, a distributed system might contain both a home domain and a directory tree, with each defining a given principal's access rights differently. It would be useful to provide the principal with a straightforward (from the principal's point of view) way to logon and use machines in the domain, machines in the directory tree, or both. Supporting different access rights for a given principal would also reduce the need to rapidly propagate changes to maintain uniform rights, thereby reducing the burden on domain controllers and directory tree administrators. However, such advances would require a distributed system that functions properly when different parts of the system have different access rights for a given principal, without using separate accounts.

Thus, it would be an advancement in the art to support multiple simultaneous access right contexts for a single principal in a distributed system.

It would be an additional advancement to provide such a method and system which is a compatible extension of known distributed directory tree and logon certificate approaches.

Such a method and system are disclosed and claimed herein.

BRIEF SUMMARY OF THE INVENTION

The present invention provides a method and system for managing security credentials in a distributed system where different locations in the system may contain different information about a principal's access rights. In one embodiment, the system is assumed to have a credential checking facility to authenticate one or more principals. A principal may be a human user. The principal may also be an agent such as a user's avatar or a system maintenance process or an information gathering "spider".

A method of the invention starts by providing the principal with a secure package in a first directory context. The secure package is provided by storing its contents in a buffer. Suitable buffers include RAM, floppy disks, hard disks, portable computers, hard tokens, removable storage media, and combinations of these individual buffers. The secure package contains information identifying the principal and also contains zero or more security credentials of the principal. The package has been at least partially encrypted or digitally signed or otherwise secured to discourage unauthorized disclosure or modification of the package contents. A "directory context" is a portion of the system throughout which the principal has identical access rights. A home domain is one of many possible examples of a directory context.

In a second directory context, the system receives an access request from the principal. The request may seek information about the system, access to information or other resources within the system, or use of the system to forward a message. The credential checking facility checks the access request by accessing the credentials in the secure package and comparing them with the system's internal security records. The system then allows or denies the access request according to the result of the credential check.

The system also determines whether credential information about the principal which is found in the second directory context was not placed in the secure package in the first directory context. If differences exist, the secure package may be modified to reflect the differences. Modification may involve digitally signing at least a portion of the secure package, such as principal identifying information and/or credentials in the secure package. Digital signatures, credentials, access rights, identifying information, and other information may be replaced, removed, or added. One method requires further verification of the principal's identity before modifying the secure package, such as by using an identification means that was not used in the first directory context when the secure package was previously provided.

A computer system according to the invention contains a first directory context including a first set of credentials of a principal and also including a providing means for providing the principal with a secure package containing at least part of the first set of credentials. The system also contains a second directory context including a second set of credentials of the principal and also including a modifying means for modifying the secure package to reflect differences between credentials in the second set and credentials which were placed in the secure package by the providing means of the first directory context.

The directory contexts may be defined at least in part according to a hierarchy or a connected graph of clearance levels and classification levels. A directory context may include a home domain of the principal and/or locations that are connected within a distributed directory such as an NDS tree. A location in the first directory context may be connected by the distributed directory to a location in the second directory context. The first context may include a first computer while the second context includes a different, second computer; the two computers may be networked, or they may include standalone or mobile disconnectable machines. Alternatively, both contexts may be defined on the same computer at different times.

Unlike other approaches, the invention allows multiple security contexts to be defined for a given principal in the system without requiring the use of multiple accounts, while still allowing the principal to roam. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and system for managing security credentials in a distributed system. The invention may be used with local area networks, wide area networks, and/or the Internet. "Internet" as used herein includes variations such as a private Internet, a secure Internet, a value-added network, a virtual private network, an extranet, or an intranet. The computers connected by the network may be workstations, laptop computers, disconnectable mobile computers, servers, mainframes, so-called "network computers", personal digital assistants, or a combination thereof. The network may include one or more LANs, wide-area networks, Internet servers and clients, intranet servers and clients, peer-to-peer nodes, network operating servers and clients, or a combination thereof.

Figure 1:
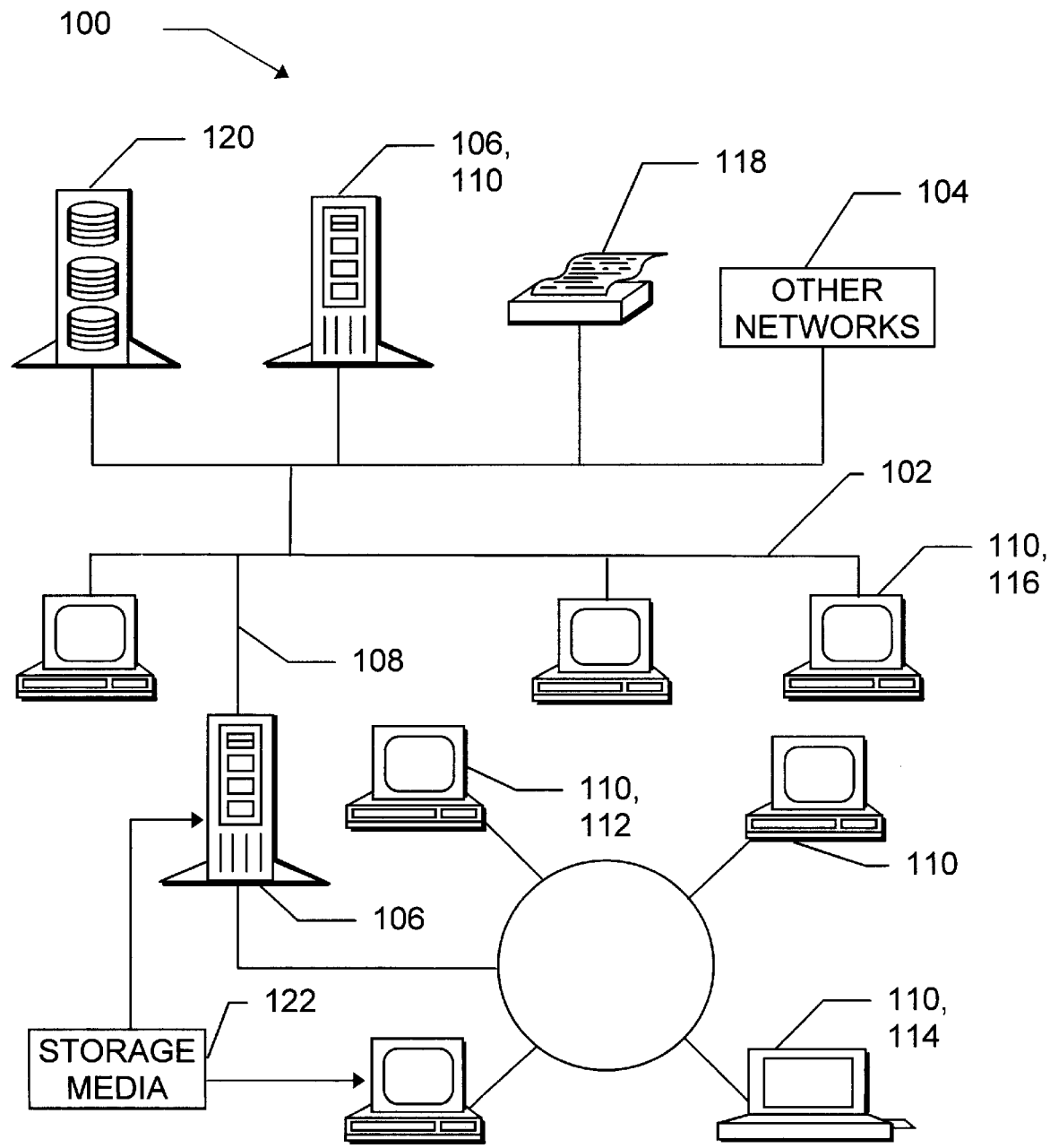
FIG. 1 is a diagram illustrating part of a computer system which is one of the many systems suitable for use with the present invention.

A portion of one of the computer systems 100 suited for use with the present invention is shown in FIG. 1. In one embodiment, the system 100 includes Novell NetWare® network operating system software (NETWARE is a registered trademark of Novell, Inc.) and Novell Directory Services software. In alternative embodiments, the system 100 includes NetWare Connect Services, VINES, TCP/IP, IPX, Windows NT, Windows 95, LAN Manager, and/or LANtastic network operating system software and/or an implementation of a distributed hierarchical partitioned object database according to the X.500 protocol or another directory service protocol such as the Lightweight Directory Access Protocol (VINES is a trademark of Banyan Systems; NT, WINDOWS 95, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as general file and print servers, as directory service providers, as name servers, as software component servers, or as a combination thereof. The servers 106 may be uniprocessor, multiprocessor, or clustered processor machines. The servers 106 and clients 110 each include an addressable storage medium such as random access memory and/or a non-volatile storage medium such as a magnetic or optical disk.

Suitable network clients 110 include, without limitation, personal computers 112, laptops 114, workstations 116, and dumb terminals. The signal lines 108 may include twisted pair, coaxial, or optical fiber cables, telephone lines, satellites, microwave relays, modulated AC power lines, and/or other data transmission "wires" known to those of skill in the art. In addition to the network client computers 110, a printer 118 and an array of disks or other persistent storage 120 are also attached to the system 100. A given computer may function both as a client 110 and as a server 106; this may occur, for instance, on computers running Microsoft Windows NT software. Although particular individual and network computer systems and components are shown, those of skill in the art will appreciate that the present invention also works with a variety of other networks and computers.

The servers 106 and the network clients 110 are capable of using floppy drives, tape drives, optical drives or other means to read a storage medium 122. A suitable storage medium 122 includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the computer system to operate in a specific and predefined manner as described herein. Thus, the medium 122 tangibly embodies a program, functions, and/or instructions that are executable by the servers 106 and/or network client computers 110 to perform credential management substantially as described herein. Suitable software for implementing the invention is readily provided by those of skill in the art using the teachings presented here and programming languages such as Java, Pascal, C++, C, assembly, firmware, microcode, and/or other languages.

Figure 2:
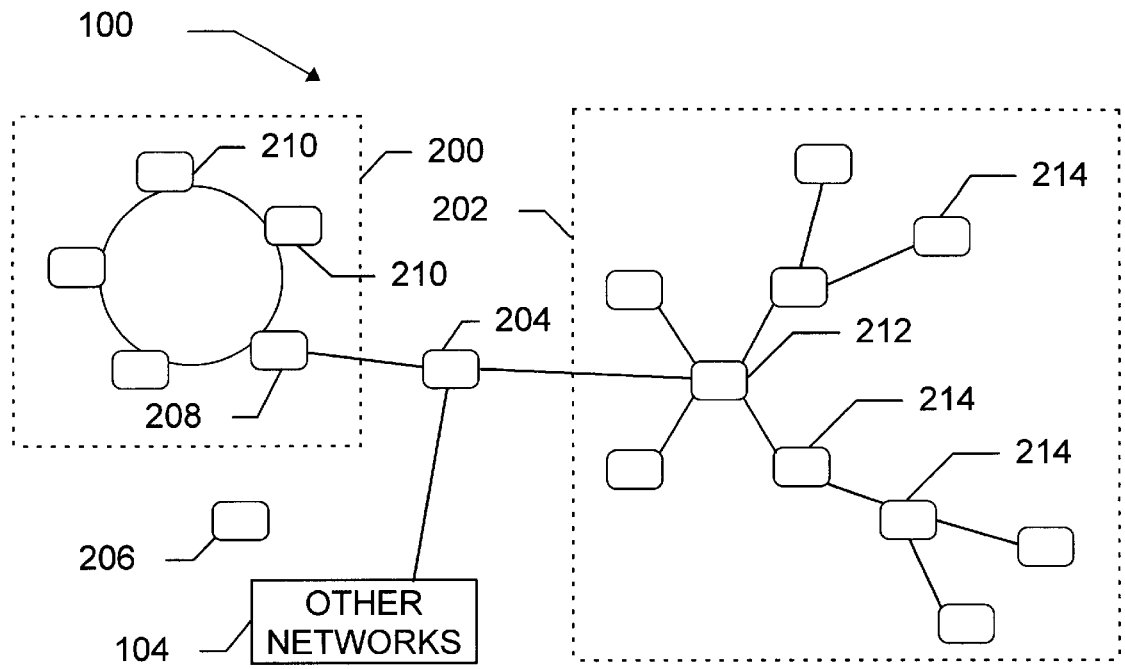
FIG. 2 is a diagram further illustrating the computer system of FIG. 1.

FIG. 2 further illustrates the system 100. The system 100 includes a home domain 200 of a principal, a distributed directory tree 202, a gateway 204 connecting the home domain 200 with the directory tree 202, and a standalone computer 206. Any one or more of these components may be omitted in other systems configured according to the invention. A system need only contain one or more computers which hold information and/or other resources to which access is restricted. The computers may be standalone computers, networked computers, mobile computers which are connectable to a network, or a combination of such computers. The principal may be a human user, a software agent, or a hardware agent which seeks access to the system or system resources.

The home domain 200 includes a domain controller 208 and other computers 210. The domain 200 may be configured using software such as Microsoft Windows NT software (marks of Microsoft Corporation) and/or software and hardware described in the Logon Certificates Applications, incorporated herein by reference.

The distributed directory tree 202 includes a master server 212 and other computers 214. The directory tree may be configured using software such as Novell Directory Services and Novell NetWare software (marks of Novell, Inc.) and/or other database, object database, hierarchical database, hierarchical object database, relational database, transactional system, X.500, networking, or directory services software.

In a conventionally configured system, the home domain 200 and the directory tree 202 would each define a context within which the principal has uniform access rights. When the system 100 is configured according to the present invention, each of the contexts 200, 202 may still be defined. However, with the invention other context definitions are also possible.

The invention supports flexible definition of one or more contexts for a given principal in a distributed system without requiring multiple accounts. A "directory context" is a portion of a system throughout which a given principal has identical access rights. Access to the system may be attempted at different locations in a single directory context, or at different locations in different directory contexts. Two attempted accesses lie within the same directory context if they are made by the same principal and if the principal's credentials are the same for each attempted access. A given computer may be part of more than one directory context, and a given directory context may include one or more computers.

For instance, after the system 100 is configured according to the invention, any of the following directory context definitions could be made:

EXAMPLE 1

Context A: home domain 200
Context B: directory tree 202
Context C: standalone machine 206

EXAMPLE 2

Context A: domain controller 210, master server 212, and gateway 204
Context B: machines 210, 214

EXAMPLE 3

Context A: home domain 200 and directory tree 202
Context B: standalone machine 206

Those of skill in the art will appreciate that numerous other directory context definitions are also possible. For instance, contexts could be defined according to rings, levels, layers, zones, or other paradigms. Moreover, the directory context definition may change over time, without direct administrator intervention, because the present invention allows modification of the secure package to reflect differences in access rights at different locations in the system.

Figure 3:
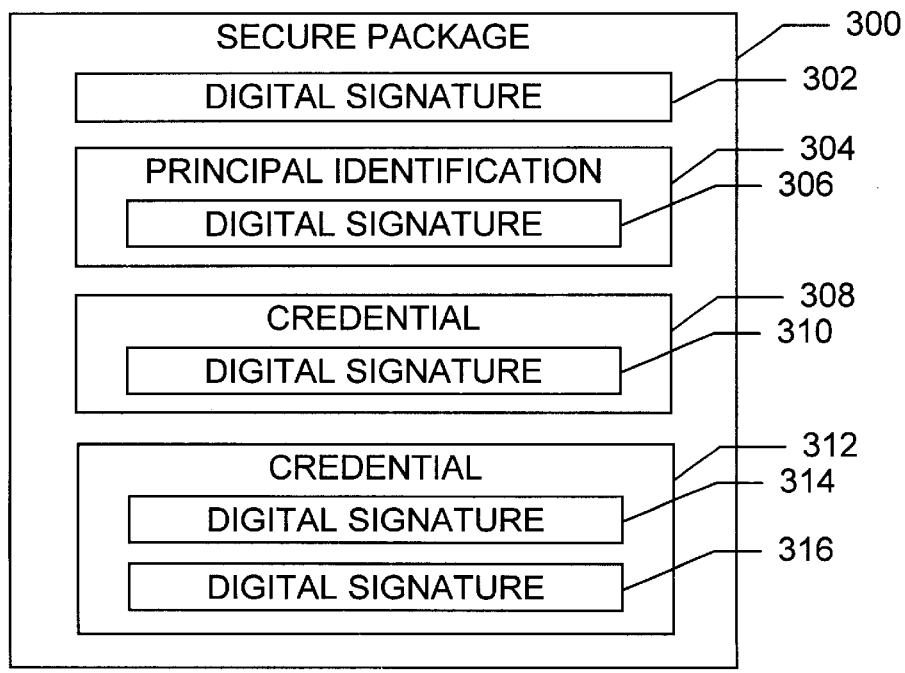
FIG. 3 is a block diagram illustrating a secure package of credentials according to the present invention.

FIG. 3 illustrates one embodiment of a secure package 300 according to the present invention. The secure package 300 includes a digital signature 302, created using means described in the Logon Certificates Applications or other means familiar to those of skill in the art. The digital signature 302 may apply to part or all of the secure package 300. In particular, the secure package 300 may contain one or more credentials to which the digital signature 302 does not apply. The digital signature 302 discourages tampering with the contents of the secure package 300 by making it possible to detect unauthorized changes to those contents. Multiple digital signatures may also be used.

In some embodiments, secure packages according to the invention are encrypted using symmetric or asymmetric encryption algorithms such as those described in the Logon Certificates Applications or other encryption means familiar to those of skill in the art. In some embodiments, the digital signature 302 for the overall secure package is omitted, and security is provided instead through encryption and/or digital signatures on one or more portions of the secure package.

The secure package 300 also includes a principal identification 304 which identifies the principal whose credentials will be managed using the secure package 300. A given user or agent may have more than one principal identification 304, and a given principal identification 304 may identify more than one user or agent. The principal identification 304 is not the equivalent of an account identification in a conventional system. A conventional account provides only one context, but the invention allows users to have different access rights associated with a single principal identification 304, depending on the current directory context of the secure package 300.

The principal identification 304 may be signed by a digital signature 306, may be signed by multiple digital signatures, or may be unsigned. The principal identification 304 may also be encrypted, or it may be both signed and encrypted.

Each secure package includes zero or more security credentials for the principal. The illustrated secure package 300 includes a first credential 308 signed by a digital signature 310, as well as a second credential 312 which is signed by two digital signatures 314 and 316. In alternative embodiments, each credential in a secure package may be signed by zero or more digital signatures, may be encrypted, or may be both signed and encrypted.

Each credential 308, 312 includes a description of the principal's access rights. Access right descriptions may include tokens, keys, group identifiers, access control lists, permissions, certificates, and other descriptions known to those of skill in the art. The access rights granted or denied or constrained may concern operations such as reading, writing, deleting, renaming, modifying security parameters, and other operations on computer systems and their resources.

The validity of a credential may be confirmed or denied during an authentication process. The system 100 includes a credential checking facility to authenticate principals by checking the validity of the credentials they present. Authentication may involve decrypting part or all of the secure package 300, recalculating a digital signature on part or all of the secure package 300 and comparing it to the corresponding digital signature 302, 306, 310, 314, 316 and so forth presented in the package 300, requiring further identification from the principal, and/or taking other steps to confirm the validity of the credentials and/or the right of the principal to those credentials. Many suitable authentication methods and mechanisms are known to those of skill in the art.

Figure 4:
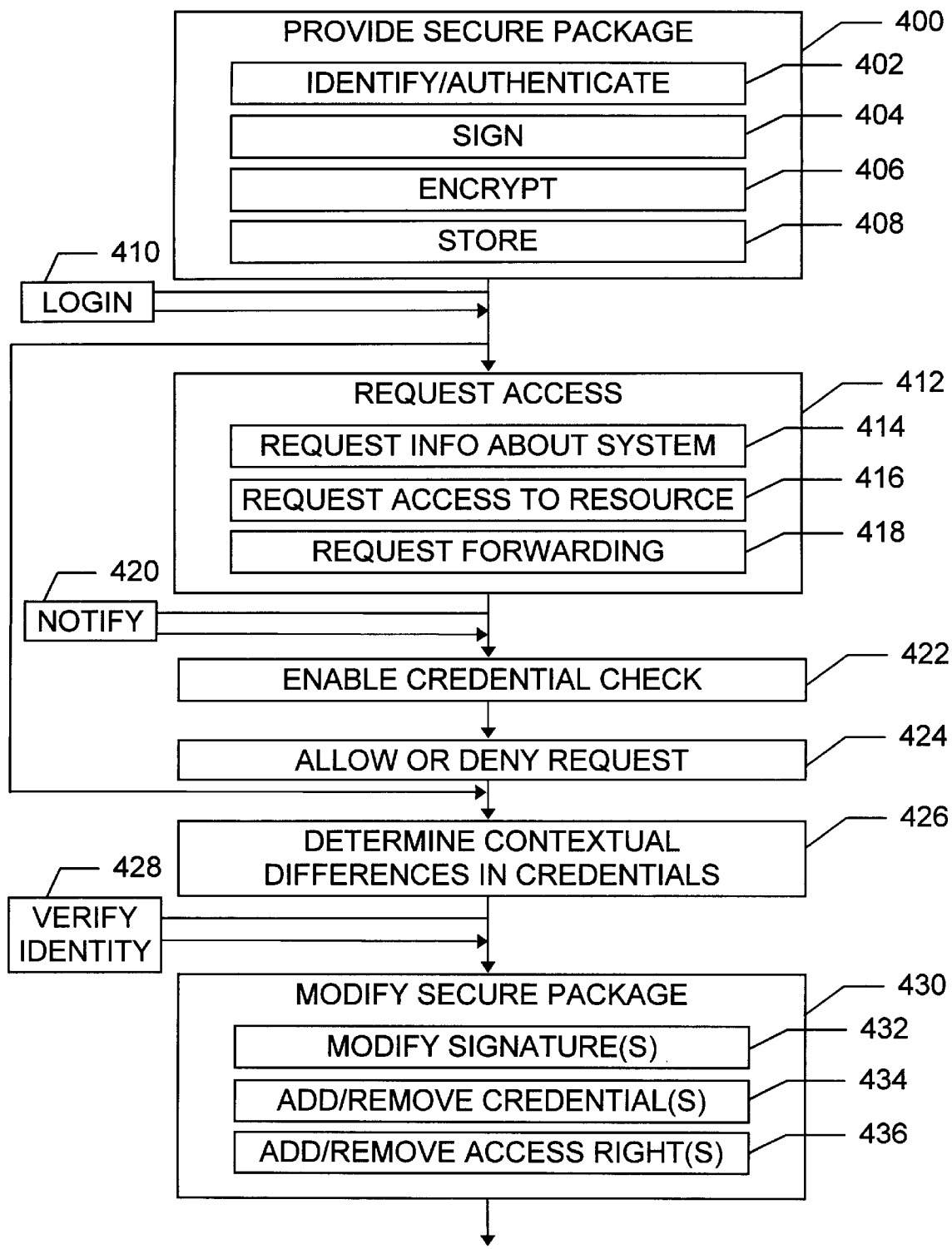
FIG. 4 is a flowchart illustrating methods of the present invention.

FIG. 4 illustrates a method of the present invention for managing credentials in a system such as the system 100 using secure packages such as the secure package 300. During a providing step 400, the system 100 provides the principal with the secure package 300. For purposes of discussion, assume the secure package 300 contains at least one credential 308. In other situations the system 100 may provide a secure package 300 containing zero credentials, thereby granting no access rights or granting only minimal default rights, according to the system's configuration.

Before providing the secure package 300, the system 100 typically performs an identification/authentication step 402 to ensure the identity of the principal and/or verify the principal's claim to the credentials. Conventional identification methods and mechanisms may be used, such as those involving passwords, magnetic cards, retinal scans, physical or digital keys, and the like. Conventional authentication methods and mechanisms may also be used.

During an optional signing step 404, the secure package 300 or a portion thereof, such as the principal identification 304 and/or the credential 308, may be digitally signed. Many suitable digital signature methods are available to those of skill in the art, including those discussed in the Logon Certificates Applications incorporated herein.

During an optional encrypting step 406, the secure package 300 or a portion thereof, such as the principal identification 304 and/or the credential 308, may be digitally signed. Many suitable encryption methods are available to those of skill in the art, including those discussed in the Logon Certificates Applications incorporated herein. Different portions of the secure package 300 may be encrypted using different encryption methods. For instance, a fast symmetric algorithm could be used in conjunction with a slower but more secure asymmetric algorithm. Likewise, different portions of the secure package 300 may be encrypted using different key lengths. The signing step 404 may precede or follow the encrypting step 406.

More generally, the steps illustrated and discussed herein may be performed in various orders, except in those cases in which the results of one step are required as input to another step. Likewise, steps may be omitted unless called for in the claims, regardless of whether they are expressly described as optional in this specification. Steps may also be repeated, as when a credential is signed, encrypted, and signed again.

During a storing step 408, the secure package contents are stored in a suitable manner to support roaming by the principal or its authorized substitutes. For instance, the secure package 300 may be stored in a buffer on a portable computer such as the laptop 114. The buffer may be volatile, such as a section of random access memory. Or the buffer may be persistent, such as storage on a hard disk or a floppy disk or a removable storage medium such as a tape or a Zip disk (ZIP is a mark of Iomega Corporation). The buffer may also be stored in a hard token such as an iPower PC card (IPOWER is a mark of National Semiconductor) or a specific network address or name.

Once the principal receives the secure package 300, the principal (or its authorized substitutes) can use the package 300 to facilitate authentication at different locations in the system 100 and to manage the access rights and credentials associated with those locations, without direct intervention by a system administrator.

The principal may login to the system 100 during an optional step 410, but access requests may also be made during a step 412 without logging in. The principal may already be logged in, or the principal may be permitted to skip login if the principal indicates it has a secure package 300 containing at least the information that would be gained by the login step 410.

Requests made during the step 412 may seek different types of access. During a step 414, the principal may request information about use of the system 100, such as the name and email address of an administrator, the clearance level required at this location by the system 100, or an address for connection to the system 100 (IP address, port number, socket number, direct dial modem number, et cetera).

During a step 416, the principal may request access to a resource on the system 100, such as file contents, object attribute values, or a list of current users. A request to execute a program, task, thread, or other computerized process is also an access request, since the execution requires processor time, memory, and possibly other system resources. In particular, during a step 418, the principal may request execution of processes which will forward a file, packet, message, or other data to another location in the system 100 or to a destination outside the system 100.

An access monitoring agent or a system administrator may be notified about the access request during an optional step 420. This may be done to detect unauthorized access attempts, to log access requests for possible later inspection, or merely to track system usage for accounting purposes.

During an enabling step 422, the credential checking facility of the system 100 is enabled to check the access request by accessing the credentials in the secure package 300. This may involve decrypting part of all of the secure package 300, recalculating one or more digital signatures based on part or all of the secure package 300 and comparing the results with the digital signatures contained in the secure package 300, and/or comparing information in the secure package 300 with information in a secure user database.

During a step 424, the system 100 either allows or denies the access request, based on the result of the credential check. If the principal's request is authenticated by the credentials in the secure package 300, the request is allowed and access is granted. Otherwise, access may be denied outright, or the principal may be given an opportunity to authenticate by alternative means such as a conventional login and authentication process. Limited access may also be allowed. For instance, if the credentials would have validated a read request but the request actually sought write access, then read-only access could be allowed.

Some systems 100 will define only a single directory context. However, the present invention also allows the providing step 400 and the requesting step 412 to occur in different directory contexts. When the secure package 300 moves between contexts, the system 100 may modify the secure package 300 to reflect some or all of the access right differences that result from the move. Such modifications may be used to propagate changes in rights on an as-needed basis without direct administrator intervention. In some cases it may be necessary for the principal to visit a given location in order to obtain a certain credential. One location need not know what rights will be granted at other locations.

Suppose the secure package 300 was provided during step 400 in a first directory context and the access request was made during step 412 in a second directory context. According to one method of the invention, during a determining step 426 the system 100 determines whether credential information about the principal which is found in the second directory context was not placed in the secure package 300 in the first directory context.

Such differences may exist for various reasons. The first context might not have the information found in the second context. The information might be restricted to use within the first context and thus not be allowed to be placed in the secure package 300. Or an access request presented by the principal in the first context might not warrant the inclusion of the credential in the secure package 300. In any case, if contextual differences in the credentials are found, the secure package 300 may be modified immediately, or it may be modified after an identifying step 428.

The identifying step 428 may be required if the second directory context adds rights, making further identification of the principal a prudent precaution before corresponding credentials are added to the secure package 300. For instance, suppose the providing step 400 only required a password to grant access rights to Confidential materials. Then the identifying step 428 might read and verify a magnetic card before granting access to Secret materials, and the identifying step 428 might perform and verify a retinal scan before granting access to Top Secret materials.

The secure package 300 may be modified during a step 430. Modification may follow an access request, precede an access request, occur periodically regardless of any access request, or be performed in a combination of these circumstances. Modification may include encryption, decryption, authentication, calculation and comparison of digital signatures, and other familiar steps. Modification may be conditioned on the nature of the credential differences found during step 426. For instance, the system 100 may be configured to propagate access rights by modifying the secure package whenever one directory context visited by the secure package 300 includes a home domain of the principal and another directory context visited by the secure package 300 does not.

The modifying step 430 may include zero or more signature modifying steps 432, credential modifying steps 434, and/or access right modifying steps 436. For instance, the modifying step 432 may include digitally signing at least a portion of the secure package 300 by digitally signing the principal identifying information 304 and/or digitally signing one or more credentials 308, 312 in the secure package 300. The signature modifying step 432 may include replacing a digital signature in the secure package with another digital signature and/or appending another digital signature (as shown in credential 312).

New information may be added to the secure package 300. The new information may be digitally signed independently of other digitally signed portions of the secure package 300 or a new digital signature covering both the original information and the appended information may be added to the secure package 300. During the step 434 the principal may be given a new credential, or a credential may be revoked. The principal may receive new access rights, or lose access rights during the step 436.

Those of skill will recognize that these various modifications to the secure package 300 are not mutually exclusive. Several such modifications may be accomplished with a single operation, such as the replacement of one credential by another credential, or the addition or removal of a credential.

In a system 100 which includes part or all of a distributed directory tree such as an NDS tree, credentials may be stored locally, in an unreplicated attribute of the distributed directory. Credentials may also be stored in an attribute of the distributed directory which is marked to require replacement of the credential information rather than in-place modification of the credential information. This allows the system 100 to determine that the secure package 300 is being moved to a new context.

In summary, the present invention provides a novel system and method for managing security credentials in a distributed computer system. Unlike other approaches, the present invention allows multiple security contexts for a given principal in a distributed system without requiring the use of multiple accounts. A secure package is provided to allow the principal to roam, and methods are provided for identifying differences in the principal's access rights in different contexts and updating the secure package as needed.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing security credentials in a system of at least one computer, the system having a credential checking facility to authenticate one or more principals, the method comprising the steps of:

in a first directory context, providing a principal with a secure package containing a credential;

in a second directory context, receiving a request from the principal to access the system;

enabling the credential checking facility to check the access request by accessing the credential in the secure package;

allowing or denying the access request according to the result of the credential check; and determining whether credential information about the principal which is found in the second directory context was not placed in the secure package in the first directory context.

2. The method of claim 1, wherein the first directory context includes a home domain of the principal and the second directory context does not include the home domain.

3. The method of claim 1, wherein the providing step includes encrypting at least a portion of the secure package.

4. The method of claim 3, wherein different portions of the secure package are encrypted using different encryption methods.

5. The method of claim 3, wherein different portions of the secure package are encrypted using different key lengths.

6. The method of claim 1, wherein the providing step places the secure package in a buffer on a portable computer.

7. The method of claim 6, wherein the buffer is a persistent buffer.

8. The method of claim 1, wherein the providing step places the secure package in a hard token.

9. The method of claim 1, wherein the providing step places the secure package in a persistent removable storage medium.

10. The method of claim 1, further comprising the step of notifying an access monitoring agent about the access request.

11. The method of claim 1, further comprising the step of digitally signing at least a portion of the secure package.

12. The method of claim 11, wherein the signing step includes digitally signing principal identifying information in the secure package.

13. The method of claim 11, wherein the signing step includes digitally signing a credential in the secure package.

14. The method of claim 1, further comprising the step of modifying the secure package to reflect credential information about the principal which is found in the second directory context and which was not placed in the secure package in the first directory context.

15. The method of claim 14, wherein the modifying step includes digitally signing at least a portion of the secure package.

16. The method of claim 15, wherein the signing step includes digitally signing principal identifying information in the secure package.

17. The method of claim 15, wherein the signing step includes digitally signing a credential in the secure package.

18. The method of claim 15, wherein the signing step includes replacing a digital signature in the secure package with another digital signature.

19. The method of claim 15, wherein the signing step includes appending new information to the secure package, the new information being digitally signed independently of other digitally signed portions of the secure package.

20. The method of claim 14, wherein the modifying step includes providing the principal with a new credential.

21. The method of claim 14, wherein the modifying step alters the principal's access rights.

22. The method of claim 21, wherein the modifying step adds a right to the principal's access rights.

23. The method of claim 21, wherein the modifying step removes a right from the principal's access rights.

24. The method of claim 14, further comprising the step of verifying the principal's identity before modifying the secure package.

25. The method of claim 24, wherein the verifying step uses an identification means that was not used in the first directory context while providing the secure package.

26. The method of claim 1, further comprising the step of modifying the second directory context to reflect credential information about the principal which is found in the secure package.

27. The method of claim 1, further comprising the step of logging onto a computer in the system before making the access request.

28. The method of claim 1, wherein the access request includes a request to obtain information about use of the system.

29. The method of claim 1, wherein the access request includes a request to use a computer in the system to forward a message directed at a destination outside the system.

30. A computer system comprising:
   a first directory context including a first set of credentials of a principal and also including a providing means for providing the principal with a secure package containing at least part of the first set of credentials;
   a second directory context including a second set of credentials of the principal and also including a modifying means for modifying the secure package to reflect differences between credentials in the second set and credentials which were placed in the secure package by the providing means of the first directory context.

31. The system of claim 30, wherein the directory contexts are defined at least in part according to a hierarchy of clearance levels and classification levels.

32. The system of claim 30, wherein the first directory context includes a home domain of the principal.

33. The system of claim 30, wherein at least one of the directory contexts contains locations connected within a distributed directory.

34. The system of claim 33, wherein a location in the first directory context is connected by the distributed directory to a location in the second directory context.

35. The system of claim 33, wherein the second set includes credential information stored in an unreplicated attribute of the distributed directory.

36. The system of claim 33, wherein the second set includes credential information stored in an attribute of the distributed directory which is marked to require replacement of the credential information rather than in-place modification of the credential information.

37. The system of claim 30, wherein the first context includes a first computer and the second context includes a different, second computer.

38. The system of claim 37, wherein the two computers are connected in a network.

39. The system of claim 37, wherein at least one of the two computers is a standalone machine.

40. The system of claim 37, wherein at least one of the two computers is a mobile computer connectable to a computer network.

41. A computer storage medium having a configuration that represents data and instructions which will cause at least a portion of a computer system to perform method steps for managing security credentials, the method steps comprising the steps of claim 1.

42. The storage medium of claim 41, wherein the method steps comprise the steps of claim 3.

43. The storage medium of claim 41, wherein the method steps comprise the steps of claim 11.

44. The storage medium of claim 41, wherein the method steps comprise the steps of claim 14.

45. The storage medium of claim 41, wherein the method steps comprise the steps of claim 21.

* * * * *